United States Patent [19]

Turner

[11] 4,085,948
[45] Apr. 25, 1978

[54] VEHICLE SUSPENSION

[75] Inventor: William Stanley Turner, Northallerton, England

[73] Assignee: York Trailer Company Limited, Northallerton, England

[21] Appl. No.: 660,325

[22] Filed: Feb. 23, 1976

[30] Foreign Application Priority Data

Nov. 17, 1975 United Kingdom ............... 47308/75

[51] Int. Cl.² .............................................. B60G 5/04
[52] U.S. Cl. .................................. 280/682; 180/24.02
[58] Field of Search ............... 280/682, 686, 676, 677, 280/680; 180/24.02

[56] References Cited

U.S. PATENT DOCUMENTS

| 1,615,360 | 1/1927 | Crocker | 280/682 |
| 2,599,043 | 6/1952 | Bissell | 180/24.02 |
| 3,186,731 | 6/1965 | Fossard | 280/686 |
| 3,224,522 | 12/1965 | Fleming | 180/24.02 |
| 3,833,236 | 9/1974 | Davis | 280/682 |

Primary Examiner—Philip Goodman
Attorney, Agent, or Firm—Wood, Herron & Evans

[57] ABSTRACT

A road vehicle having at least one pair of wheels at each side the axles of which are connected together by a tandem suspension in such a way that as one wheel of a pair is subjected to load during running, a part of the load is transmitted by the suspension to the axle of the other wheel of the pair so that the load is shared between the axles characterized in that a pair of rocker plates is pivotally mounted on the vehicle for each of the two axles of the pair at each side of the vehicle, each pair of rocker plates being so located and arranged as to pivotally to engage each end respectively of a leaf spring associated with the respective axle, the four rocker plates at each side of the vehicle being pivotally connected by a connecting rod.

9 Claims, 4 Drawing Figures

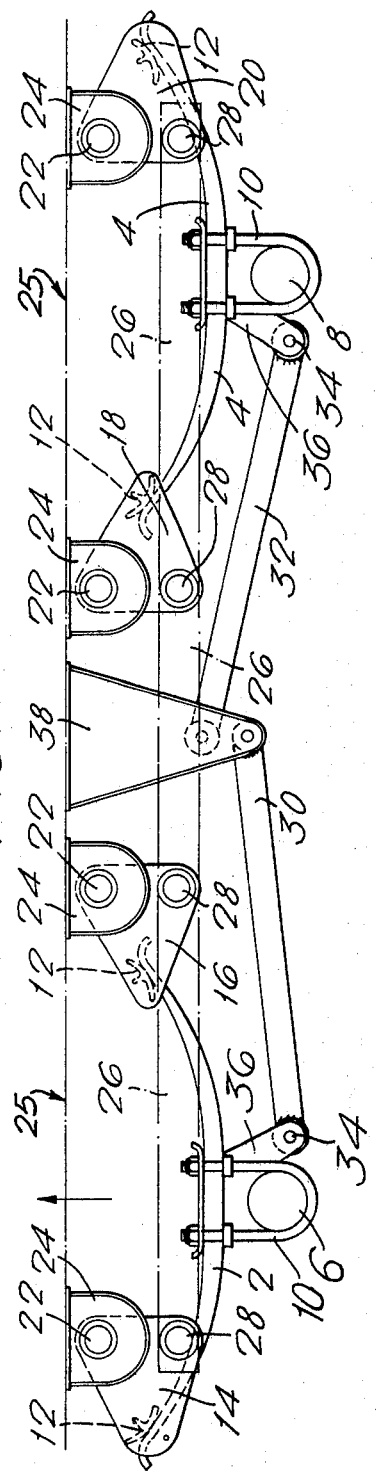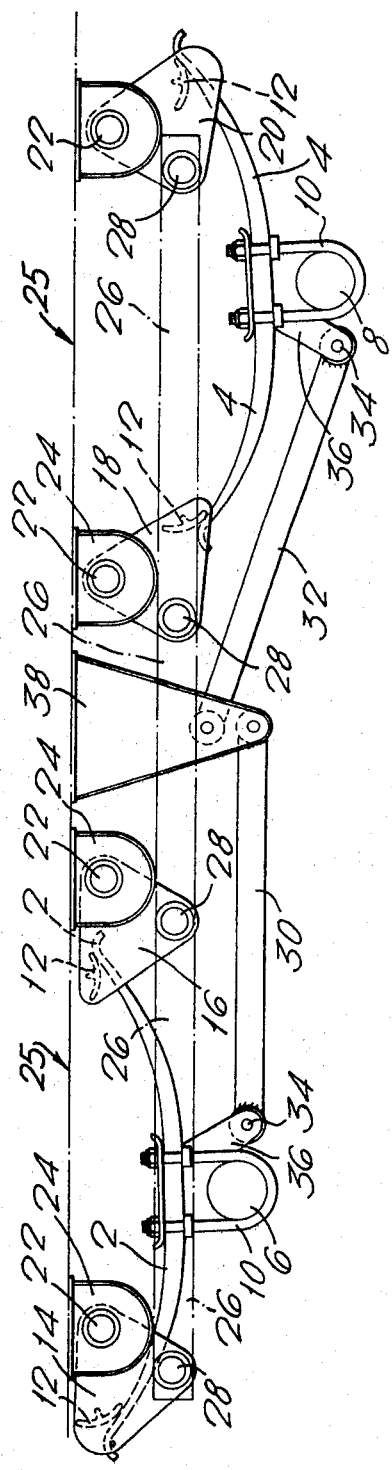

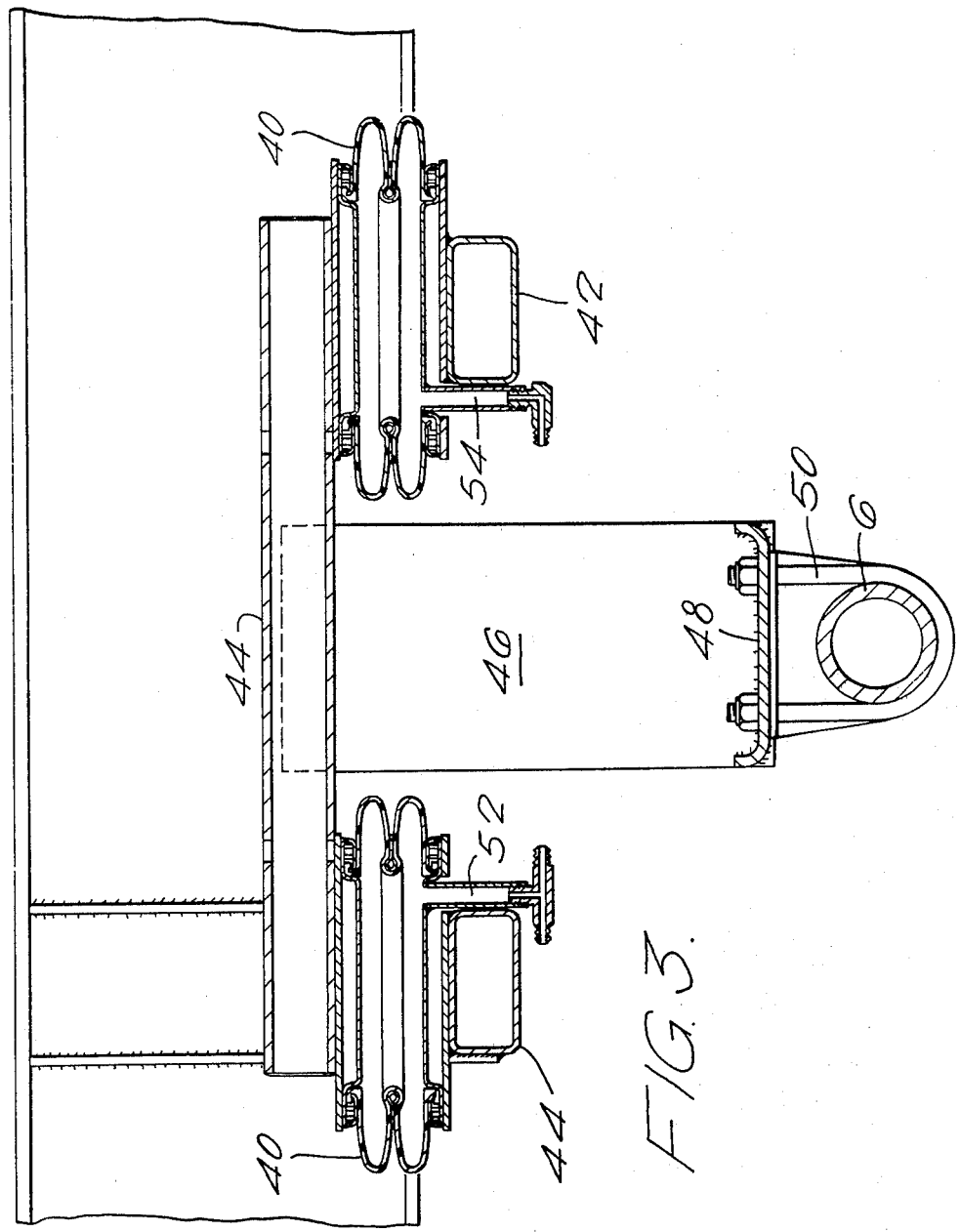

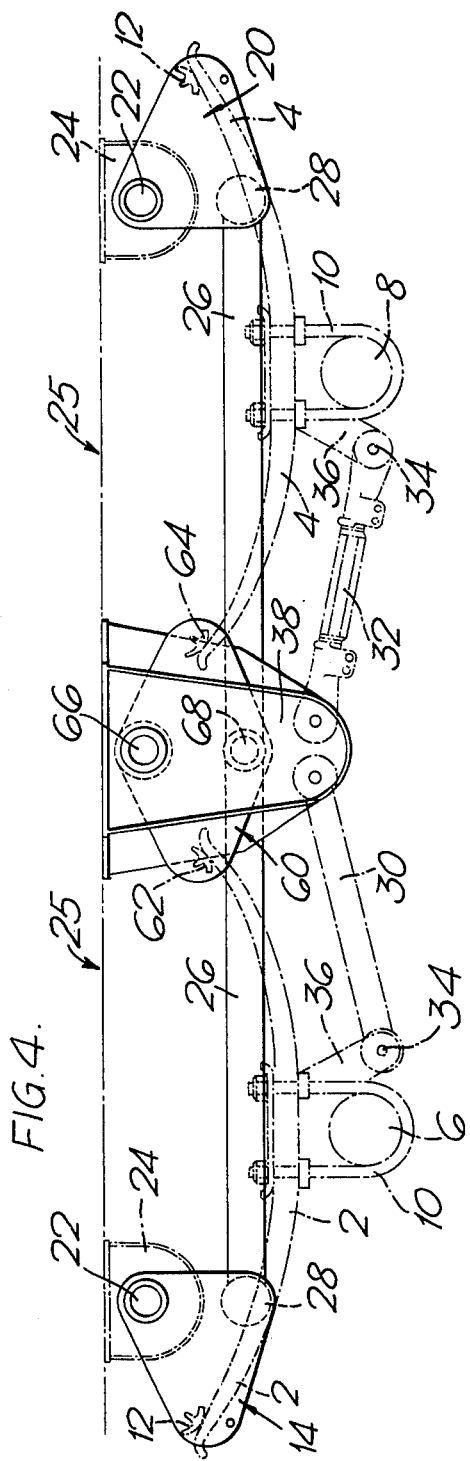

VEHICLE SUSPENSION

This invention relates to road vehicle suspension and in particular to axle suspension for trailers, semitrailers and tractor vehicles of the type in which a pair of wheels at each side of the vehicle are connected in tandem in such a way that as one wheel of a pair is subjected to load, for example when the vehicle passes over a bump in the road, a part of the load is transmitted by the suspension to the axle of the other wheel of the pair so that the load is shared between the axles. Such suspensions will hereafter be referred to as a "tandem suspension".

A road vehicle in accordance with this invention has a "tandem suspension" comprising, for each of the two axles at each side of the vehicle pivotal mounting means so located and arranged that each end of each of the two axle leaf springs can move vertically, the pivotal mountings for each end of each spring being pivotally connected by a connecting link.

The pivotal mounting means may comprise at each side of the vehicle two axles, a pair of rocker plater pivotally mounted on the vehicle and so located and arranged as to engage each end respectively of the axle leaf spring, the four rocker plates at each side of the vehicle being pivotally connected by the connecting link. Alternatively only three rocker plates may be pivotally mounted at each side of the vehicle, the central rocker plate engaging the adjacent ends of the two axle leaf springs and the other two rocker plates engaging the other ends, respectively of the two springs the three rocker plates at each side of the vehicle being pivotally connected by the connecting link.

Such a suspension will operate as a normal tandem axle suspension to share the load on one axle with the other but has the advantage that if one axle, say the relatively front axle, is lifted by any convenient means for example, air bags, the connecting link operates to cause the other axle for example the relatively rear axle to move downwardly and thereafter operate as a normally sprung axle. Thus when it is desired to lift one axle for example when a trailer is making a journey unladen or relatively lightly laden, one can save fuel, wear or tyres and on the suspension (suspension wear being fairly high when a tandem suspension is being run unladen).

Further as one axle is moved downwardly as the other axle is moved upwardly, the necessary clearance of 6 inches to 7 inches can be achieved with only an upward movement of one axle of about 3 inches or 3½ inches diminishes problems of clearance space and extent of movement of any one axle.

The rocker plates are preferably provided with slipper pads which rest on the upper face of the ends of the leaf springs.

Each axle is preferably connected to a hanger bracket located between the axles and depending downwardly from the vehicle frame, by means of a rod pivotally connected to the hanger bracket, these rods acting longitudinally to locate the axles.

The invention will now be further described by way of example with reference to the accompanying drawings in which:

FIG. 1 is a diagrammatic view of one embodiment of a tandem suspension of a vehicle in accordance with the invention, FIG. 2 is a view similar to FIG. 1 but showing the suspension with one axle lifted, FIG. 3 is a cross-sectional view on the centre line of the vehicle to illustrate means of lifting one of the axles, and FIG. 4 is a diagrammatic view similar to FIG. 1 of a second embodiment of a tandem suspension of a vehicle in accordance with the invention.

Referring to FIGS. 1 and 2 the suspension comprises at each side of the vehicle. leaf springs 2, 4 for the relatively forward and rearward axles 6, 8 of a pair which work in tandem to carry load, the axles being connected to the leaf springs by conventional U-bolts 10.

Both ends of both leaf springs are engaged by slipper pads 12 carried by rocker plates 14 and 16 (for the front axle) and 18, 20 (for the rear axle), i.e., front rocket plate 14, central rocker plates 16, 18, and rear rocker plate 20. Each rocker plate is pivotally connected as indicated at 22 to brackets 24 depending down from a side rail of the vehicle (which is not further illustrated in FIGS. 1 and 2.

The four rocker plates are connected by connector structure in the form of a connecting rod 26 which is pivotted to each plate as indicated at 28 beneath the pivots 22.

As can be seen in FIG. 1 the rocker plates are substantially triangular in shape, the slipper pads 12 of the two plates 14, 16 for the forward axle being located in advance of the pivots 22, 28. The slipper pads of the two plates 18, 20 for the rear axle being located rearwardly of the pivots 22, 28.

As the slipper pads only rest on the ends of the springs the axles are not located longitudinally and hence radius rods 30, 32 are provided. Each rod being pivotally attached at 34 to a bracket 36 connected to the U-bolt member 10 respectively and to a hanger bracket 38 located between the axles and depending down from the vehicle frame.

When the vehicle is laden and running with the suspension in the general position illustrated in FIG. 1, the suspension acts to transfer some of the load applied from one axle to the other. For example if the front axle 6 should pass over a bump in the road, the vertical force exerted on axle 6 is transmitted to the spring 2 which exerts an upward force on the rocker plates 14 and 16 tending to turn these in a clockwise direction about their pivots 22, as seen in FIG. 1. This movement causes the connecting rod to tend to move to the left as seen in the drawing to exert a force on the rocker plates 18, 20 of the rear axle tending to turn these also in a clockwise direction. Clockwise movement of the rocker plates 18, 20 will cause the slipper pads of those rockers to press down on the spring 4 of the rear axle so as to cause this spring to share the load to which the front axle is subjected.

When it is desired to run the vehicle with only a single axle either of the two axles may be lifted relative to bed 25 to the vehicle. In the particular embodiment illustrated the front axle 6 is lifted by inflation of lifting device in the form of a pair of air bags 40 (see FIG. 3) which are interposed on the centre line of the vehicle between cross members 42 of the frame and a tie bar 44. The tie bar carries the axle 6 through cheek plates 46, a clamp plate 48 and U-bolt 50.

The air bags 40 are connected to a source of compressed air e.g. the vehicle's brake supply through inlets 52, 54 and appropriate valving, the arrangement being such that the bags can be inflated and the axle 6 lifted, or the bags open to atmosphere allowing the axle to drop to its normal position.

When the axle 6 is lifted, by inflation of the air bags from say 3 inches to 3½ inches, the leaf springs 2 on each side of the vehicle are also raised causing the rocker plates 14 and 16 to rotate in a clockwise direction to the position shown in FIG. 2. This rotation of the brackets causes the tie bar 26 to move to the left as seen in the drawings which acts to rotate the brackets 18, 20 in a clockwise direction to the position shown in FIG. 2, lowering the rear axle 8 also by an amount of 3 inches to 3½ inches. Thus the effective clearance between the front and rear axles is say 7 inches.

The vehicle may then run with a single axle suspension which, when the vehicle is unladen or lightly laden helps to save fuel and to avoid tyre wear due for example to tyre scrub when cornering. In this condition the suspension for the rear axle 8 does not act as a tandem suspension so wear is saved and also forces on the suspension are damped to some degree by the air bags.

When the suspension is running as a tandem suspension i.e., in the position illustrated in FIG. 1, the suspension of this invention helps to eliminate "axle hop" and hence reduces axle load during braking and reduces the stopping distance. This is achieved because when braking both axles tend to turn in an anti-clockwise direction, the front pair of rockers 14 and 20 thus tending to turn in an anti-clockwise direction whereas due to the arrangement of pivots, the rear pair of rockers 16, 18 tend to turn in a clockwise direction. Braking forces in the front axle are equalised by the front section of tie rod 26, braking forces in the rear axle are equalised by the rear section of the tie rod 26. There are therefore no undesirable forces in the centre section of the tie rod which would cause with a conventional tandem suspension, load transfer during braking.

An alternative form of suspension which operates in a substantially similar way to that described with reference to FIGS. 1 to 3 is generally indicated in FIG. 4.

Futhermore the suspension of the invention gives greatly increased articulation as compared with conventional tandem suspension which helps to prevent the front pair of wheels being lifted off the ground on a significant change of road camber. As will be appreciated with the suspension illustrated in the drawings, if the rear pair of wheels are forced up by the change in camber the front axle is forced down by an amount which may be significantly more than the amount by which the rear axle is lifted.

What I claim is:

1. A tandem axle suspension system for a vehicle, said suspension system connecting a front axle and a rear axle together in tandem, said suspension system, on each side of said vehicle, comprising
    a front rocker plate, at least one central rocker plate, and a rear rocker plate, all of said rocker plates being pivotally connected to said vehicle,
    a front leaf spring connected to said front axle, and a rear leaf spring connected to said rear axle, the front end of said front leaf spring being engaged with said front rocker plate, the rear end of said front leaf spring and the front end of said rear leaf spring being engaged with said central rocker plate, and the rear end of said rear leaf spring being engaged with said rear rocker plate,
    a connecting rod pivotally connected at one end to said front rocker plate, pivotally connected intermediate the ends thereof to said central rocker plate, and pivotally connected at the rear end to said rear rocker plate, said rocker plates and connecting rod cooperating so that, when one of said axles is subjected to a vertical load during use, a part of that load is transmitted through said connecting link and said rocker plates to the other of said axles to establish sharing of the load between said axles,
    at least one slipper pad connected to each rocker plate, each slipper pad being positioned to rest on the upper face of an end of a leaf spring, those slipper pads cooperating with said front leaf spring being located forwardly of the pivot connections of said front and central rocker plates, and those slipper pads cooperating with said rear leaf spring being located rearwardly of the pivot connections of said central and rear rocker plates, and
    a first radius rod connected at one end to said front axle and at the other end to said vehicle, and a second radius rod connected at one end to said rear axle and at the other end to said vehicle, said radius rods preventing front-to-rear motion of said axles but permitting up-and-down motion of said axles.

2. A tandem axle suspension system as set forth in claim 1 including
    two central rocker plates, the rear end of said front leaf spring being engaged with one of said central rocker plates and the front end of said rear leaf spring being engaged with the other of said central rocker plates, both said central rocker plates being pivotally connected to said connecting rod.

3. A tandem axle suspension system as set forth in claim 1, the rear end of said front leaf spring being engaged with said central rocker plate forwardly of that central rocker plate's pivotal connection to said vehicle, and the front end of said rear leaf spring being engaged with said central rocker plate rearwardly of that central rocker plate's pivotal connection to said vehicle.

4. A tandem axle suspension system as set forth in claim 1 including
    a lifting device connected to at least one of said front and rear axles, said lifting device being selectively operable to raise and lower that one axle relative to the bed of said vehicle when desired, raising of that one axle causing the other axle to lower relative to the bed of said vehicle in response to the interconnection of the other axle with that one axle through said connecting rod and rocker plates, thereby permitting said vehicle to be supported through use of only one of said axles when desired.

5. A tandem axle suspension system as set forth in claim 4, said lifting device including
    an air bag connected at one end to said vehicle, said axle being carried on the other end of said air bag, and inflation of said air bag causing said axle to be moved vertically.

6. A tandem axle suspension system for a vehicle, said suspension system connecting a front axle and a rear axle together in tandem, said suspension system comprising
    a lifting device connected to at least one of said front and rear axles, said lifting device being selectively operable to raise and lower that one axle relative to the bed of said vehicle when desired,
    a front leaf spring connected to said front axle, and a rear leaf spring connected to said rear axle,
    connector structure interconnecting said front and rear axle, said connector structure causing the other of said axles to lower relative to the bed of said vehicle in response to the raising of said one axle by said lifting device, thereby permitting said vehicle to be supported through use of only one of said axles when desired, said connector structure including a front rocker plate, at least one central rocker plate, and a rear rocker plate, all of said rocker plates being pivotally connected to said vehicle, the front end of said front leaf spring being engaged with said front rocker plate, the rear end of said front leaf spring and the front end of said rear leaf spring being engaged with said central rocker plate, and the rear end of said rear leaf spring being engaged with said rear rocker plate, a connecting rod pivotally connected at one end to said front rocker plate, pivotally connected intermediate the ends thereof to said central rocker plate, and pivotally connected to the rear end to said rear rocker plate, said rocker plates and connecting rod cooperating so that, when one of said axles is subjected to a vertical load during use, a part of that load is transmitted through said connecting link and said rocker plates to the other of said axles to establish sharing of the load between said axles, and at least one slipper pad connected to each rocker plate, each slipper pad being positioned to rest on the upper face of an end of a leaf spring, those slipper pads cooperating with said front leaf spring being located forwardly of the pivot connections of said front and central rocker plates, and those slipper pads cooperating with said rear leaf spring being located rearwardly of the pivot connections of said central and rear rocker plates.

7. A tandem axle suspension system as set forth in claim 6, said lifting device including an air bag connected at one end to said vehicle, said axle being carried on the other end of said air bag, and inflation of said air bag causing said axle to be moved vertically.

8. A tandem axle suspension system as set forth in claim 6, said system including a first radius rod connected at one end to said front axle and at the other end to said vehicle, and a second radius rod connected at one end to said rear axle and at the other end to said vehicle, said radius rod preventing front-to-rear motion of said axles but permitting up-and-down motion of said axle.

9. A tandem axle suspension system as set forth in claim 6 including two central rocker plates, the rear ends of said front leaf spring being engaged with one of said central rocker plates and the front end of said rear leaf spring being engaged with the other of said central rocker plates, both said central rocker plates being pivotally connected to said connecting rod.

* * * * *